(12) United States Patent
Tisdale et al.

(10) Patent No.: US 9,043,072 B1
(45) Date of Patent: May 26, 2015

(54) METHODS AND SYSTEMS FOR CORRECTING AN ESTIMATED HEADING USING A MAP

(71) Applicant: Google Inc., Mountain View, CA (US)

(72) Inventors: John Tisdale, Berkeley, CA (US); Russell Smith, Santa Clara, CA (US); Nathaniel Fairfield, Mountain View, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/856,822

(22) Filed: Apr. 4, 2013

(51) Int. Cl.
*G05D 1/00* (2006.01)
*G05D 1/02* (2006.01)

(52) U.S. Cl.
CPC ........................... *G05D 1/021* (2013.01)

(58) Field of Classification Search
CPC ........... G05D 1/00; G05D 1/24; G05D 1/274; G05D 2201/0213; G05D 1/27; G05D 1/88; G05D 1/246; G05D 1/272; G05D 1/278; B60W 30/00; B60W 10/06; B60W 10/20; B60W 2550/147
USPC .................................................. 701/28, 408
See application file for complete search history.

(56) References Cited

U.S. PATENT DOCUMENTS

| | | | |
|---|---|---|---|
| 6,469,664 B1* | 10/2002 | Michaelson et al. | 342/357.31 |
| 6,975,246 B1* | 12/2005 | Trudeau | 340/903 |
| 7,539,557 B2 | 5/2009 | Yamauchi | |
| 7,684,916 B2* | 3/2010 | Wei et al. | 701/50 |
| 7,831,433 B1* | 11/2010 | Belvin et al. | 704/275 |
| 7,957,858 B1* | 6/2011 | Larson et al. | 701/23 |
| 7,991,576 B2 | 8/2011 | Roumeliotis | |
| 8,050,863 B2 | 11/2011 | Trepagnier et al. | |
| 8,676,466 B2* | 3/2014 | Mudalige | 701/93 |
| 8,706,417 B2* | 4/2014 | Zeng et al. | 701/533 |
| 2009/0140887 A1 | 6/2009 | Breed et al. | |
| 2011/0213513 A1* | 9/2011 | Naderhirn | 701/3 |
| 2012/0083959 A1 | 4/2012 | Dolgov et al. | |
| 2012/0303222 A1* | 11/2012 | Cooprider et al. | 701/48 |
| 2013/0131908 A1* | 5/2013 | Trepagnier et al. | 701/23 |
| 2013/0184926 A1* | 7/2013 | Spero et al. | 701/26 |
| 2014/0172290 A1* | 6/2014 | Prokhorov et al. | 701/408 |

OTHER PUBLICATIONS

Hayakawa et al., "Driver-compatible Steering System for Wide Speed-Range Path Following," IEEE/ASME Transactions of Mechatronics, vol. 9, No. 3, Sep. 2004, pp. 544-552.*

* cited by examiner

*Primary Examiner* — Calvin Cheung
*Assistant Examiner* — Allen E Quillen
(74) *Attorney, Agent, or Firm* — McDonnell Boehnen Hulbert & Berghoff LLP

(57) ABSTRACT

Methods and systems for correcting an estimated heading using a map are disclosed. Map data indicative of a map of an environment of a vehicle and data indicative of an estimated heading the vehicle is received. A sensor obtains first spatial data indicative of locations of objects in the environment relative to the vehicle at a first time. A first location of the vehicle on the map is determined based on the first spatial data. The sensor obtains second spatial data indicative of locations of objects in the environment relative to the vehicle at a second time. A second location of the vehicle on the map is determined based on the second spatial data. A heading correction of the vehicle is determined based on the estimated heading, the first location, the first time, the second location, and the second time, and a speed of the vehicle.

20 Claims, 14 Drawing Sheets

METHODS AND SYSTEMS FOR CORRECTING AN ESTIMATED HEADING USING A MAP

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

SUMMARY

Methods and systems for correcting heading using a map are disclosed herein. Beneficially, the disclosed methods and systems can allow a vehicle, such as a driverless automobile configured to operate in an autonomous mode, to navigate through some environments where data from one or more sensors associated with the vehicle might not be suitable for the vehicle and its associated computer-implemented controller to use to navigate through such environments.

In some embodiments of the present disclosure, a method involves receiving map data that is indicative of a map of an environment of a vehicle. The method can involve receiving, from an inertial navigation system associated with the vehicle, data indicative of an estimated heading of the vehicle. The method can involve receiving first spatial data obtained using a sensor associated with the vehicle. The first spatial data is indicative of locations of objects in the environment relative to the vehicle at a first time. The method can involve determining a first location of the vehicle on the map based on the first spatial data. The method can involve receiving second spatial data obtained using the sensor associated with the vehicle. The second spatial data is indicative of locations of objects in the environment relative to the vehicle at a second time. The method can involve determining a second location of the vehicle on the map based on the second spatial data. The method can involve determining, by a computing device, a heading correction of the vehicle based on the estimated heading, the first location, the first time, the second location, the second time, and a speed of the vehicle. And the method can involve navigating the vehicle based on the estimated heading and the heading correction.

In some embodiments of the present disclosure, a system is disclosed. The system can include a sensor associated with a vehicle, a processing unit, non-transitory data storage, and program instructions stored in the non-transitory data storage and executable by the processing unit to carry out functions comprising: receiving map data that is indicative of a map of an environment of the vehicle; receiving, from an inertial navigation system associated with the vehicle, data indicative of an estimated heading of the vehicle; receiving first spatial data obtained using the sensor associated with the vehicle, wherein the first spatial data is indicative of locations of objects in the environment relative to the vehicle at a first time; determining a first location of the vehicle on the map based on the first spatial data; receiving second spatial data obtained using the sensor associated with the vehicle, wherein the second spatial data is indicative of locations of objects in the environment relative to the vehicle at a second time; determining a second location of the vehicle on the map based on the second spatial data; determining a heading correction of the vehicle based on the estimated heading, the first location, the first time, the second location, the second time, and a speed of the vehicle; and navigating the vehicle based on the estimated heading and the heading correction.

In some embodiments of the present disclosure, a non-transitory computer-readable medium having program instructions stored thereon is disclosed. The non-transitory computer-readable medium stores program instructions that, when executed by a computing device, cause the computing device to perform functions comprising: receiving map data that is indicative of a map of an environment of a vehicle; receiving, from an inertial navigation system associated with the vehicle, data indicative of an estimated heading of the vehicle; receiving first spatial data obtained using a sensor associated with the vehicle, wherein the first spatial data is indicative of locations of objects in the environment relative to the vehicle at a first time; determining a first location of the vehicle on the map based on the first spatial data; receiving second spatial data obtained using the sensor associated with the vehicle, wherein the second spatial data is indicative of locations of objects in the environment relative to the vehicle at a second time; determining a second location of the vehicle on the map based on the second spatial data; determining a heading correction of the vehicle based on the estimated heading, the first location, the first time, the second location, the second time, and a speed of the vehicle; and navigating the vehicle based on the estimated heading and the heading correction.

In some embodiments of the present disclosure, a system is disclosed. The system can include means for receiving map data that is indicative of a map of an environment of a vehicle; means for receiving, from an inertial navigation system associated with the vehicle, data indicative of an estimated heading of the vehicle; means for receiving first spatial data obtained using a sensor associated with the vehicle, wherein the first spatial data is indicative of locations of objects in the environment relative to the vehicle at a first time; means for determining a first location of the vehicle on the map based on the first spatial data; means for receiving second spatial data obtained using the sensor associated with the vehicle, wherein the second spatial data is indicative of locations of objects in the environment relative to the vehicle at a second time; means for determining a second location of the vehicle on the map based on the second spatial data; means for determining a heading correction of the vehicle based on the estimated heading, the first location, the first time, the second location, the second time, and a speed of the vehicle; and means for navigating the vehicle based on the estimated heading and the heading correction.

These as well as other aspects, advantages, and alternatives, will become apparent to those of ordinary skill in the art by reading the following detailed description, with reference where appropriate to the accompanying drawings.

DETAILED DESCRIPTION

Example embodiments relate to an autonomous vehicle, such as a driverless automobile, that includes one or more sensors for receiving spatial data that is indicative of locations of objects in an environment surrounding and/or relative to the vehicle. A controller analyzes information from the one or more sensors to identify the surroundings of the vehicle and determines how to direct the propulsion systems of the vehicle to affect a navigation path that substantially avoids obstacles indicated by the information from the one or more sensors.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible. Moreover, the example methods may also be carried out in whole or in part by a vehicle that may not be autonomous, such as a vehicle where some functions of the vehicle are manually controlled by a driver that is in the vehicle and/or an operator that is remote from the vehicle. Other examples are also possible.

Example systems within the scope of the present disclosure will now be described in greater detail. An example system may be implemented in, or may take the form of, an automobile. However, an example system may also be implemented in or take the form of other vehicles that can primarily move in a single direction with respect to a body fixed-frame, such as cars, trucks, motorcycles, buses, airplanes, lawn mowers, earth movers, snowmobiles, recreational vehicles, amusement park vehicles, farm equipment, construction equipment, trams, golf carts, trains, and trolleys. Other vehicles are possible as well.

Figure 1:
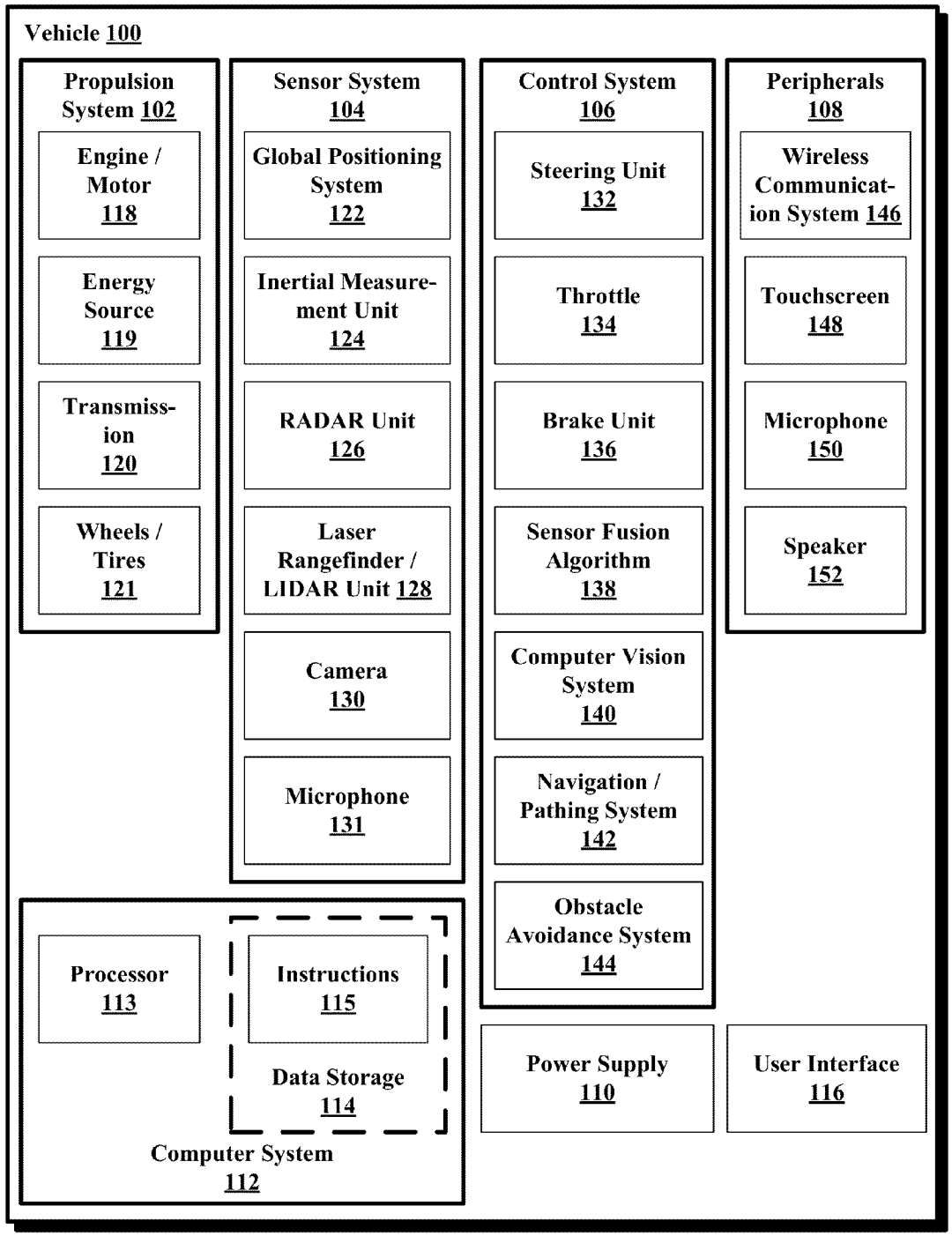
FIG. 1 is a functional block diagram depicting a vehicle according to an example embodiment.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from a sensor system 104, and base one or more control processes (such as setting a heading so as to avoid a detected obstacle) upon the received information in an automated fashion.

The vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, the sensor system 104, the control system 106, one or more peripherals 108, a power supply 110, the computer system 112, and a user interface 116. The vehicle 100 may include more or fewer subsystems and each subsystem can optionally include multiple components. Further, each of the subsystems and components of the vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission 120. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires 121 can be arranged as a unicycle, bicycle, motorcycle, tricycle, or car/truck four-wheel format. Other wheel/tire geometries of the wheels/tires 121 are possible, such as those including six or more wheels. Any combination of the wheels/tires 121 of the vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding and/or relative to the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor one or more internal systems of the vehicle 100 (e.g., $O_2$ monitor, fuel gauge, engine oil temperature, wheel speed sensors, etc.). One or more of the sensors included in the sensor system 104 could be configured to be actuated separately and/or collectively in order to modify a position and/or an orientation of the one or more sensors.

The GPS 122 is a sensor configured to estimate a geographic location of the vehicle 100. To this end, the GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on acceleration and/or rotation. The IMU 124 can provide data indicative of an estimated heading to the vehicle 100. However, in some situations, the estimated heading might need to be corrected after a predetermined time period to correct an error in the IMU 124 that accumulates over time.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder/LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture image data, such as one or more images, of the environment surrounding and/or relative to the vehicle 100. The camera 130 can be a still camera or a video camera. In some embodiments, the camera 130 can be mechanically movable such as by rotating and/or tilting a platform to which the camera is mounted. As such, a control process of the vehicle 100 may be implemented to control the movement of the camera 130.

The sensor system 104 can also include a microphone 131. The microphone 131 can be configured to capture sound from the environment surrounding and/or relative to the vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, a throttle 134, a brake unit 136, a sensor fusion algorithm 138, a computer vision system 140, a navigation/pathing system 142, and/or an obstacle avoidance system 144, etc.

The steering unit 132 is operable to adjust the heading of the vehicle 100. For example, the steering unit 132 can adjust the axis (or axes) of one or more of the wheels/tires 121 so as to effect turning of the vehicle 100. The throttle 134 is configured to control, for instance, the operating speed of the engine/motor 118 and, in turn, adjust forward acceleration of the vehicle 100 via the transmission 120 and the wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding and/or relative to the vehicle 100 based on the data from the sensor system 104. In some embodiments, the assessments can include evaluations of individual objects and/or features in the environment surrounding and/or relative to the vehicle 100, evaluations of particular situations, and/or evaluations of possible interference between the vehicle 100 and features in the environment (e.g., such as predicting collisions and/or impacts) based on the particular situations.

The computer vision system 140 can process and analyze image data captured by the camera 130 to identify objects and/or features in the environment surrounding and/or relative to the vehicle 100. The detected features/objects can include traffic signals, road way boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation/pathing system 142 is configured to determine a driving path for the vehicle 100. For example, the navigation/pathing system 142 can determine a series of speeds and directional headings to effect movement of the vehicle 100 along a path that substantially avoids perceived obstacles while generally advancing the vehicle 100 along a roadway-based path leading to an ultimate destination, which can be set according to user inputs via the user interface 116, for example. The navigation/pathing system 142 can additionally be configured to update the driving path dynamically while the vehicle 100 is in operation on the basis of perceived obstacles, traffic patterns, weather/road conditions, etc. In some embodiments, the navigation/pathing system 142 can be configured to incorporate data from the sensor fusion algorithm 138, the GPS 122, and one or more predetermined maps so as to determine the driving path for the vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from one or more occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and the energy source 119 can be implemented together, as in some all-electric cars.

Many or all of the functions of the vehicle 100 can be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 includes at least one processor 113 (which can include at least one microprocessor) that executes instructions 115 stored in a non-transitory computer-readable medium, such as data storage 114. The computer system 112 may also represent a plurality of computing devices that serve to control individual components or subsystems of the vehicle 100 in a distributed fashion.

In some embodiments, the data storage 114 contains instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of the vehicle 100, such as an occupant in a passenger cabin of the vehicle 100. The user interface 116 can accordingly include one or more input/output devices within the peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein can be configured to work in an interconnected fashion with other components within or outside their respective systems. For example, the camera 130 can capture image data that represents information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although the vehicle 100 is described and shown in FIG. 1 as having various components, e.g., the wireless communication system 146, the computer system 112, the data storage 114, and the user interface 116, integrated into the vehicle 100, one or more of these components can optionally be mounted or associated separately from the vehicle 100. For example, the data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up the vehicle 100 can generally be communicatively coupled together in a wired and/or wireless fashion.

Figure 2:
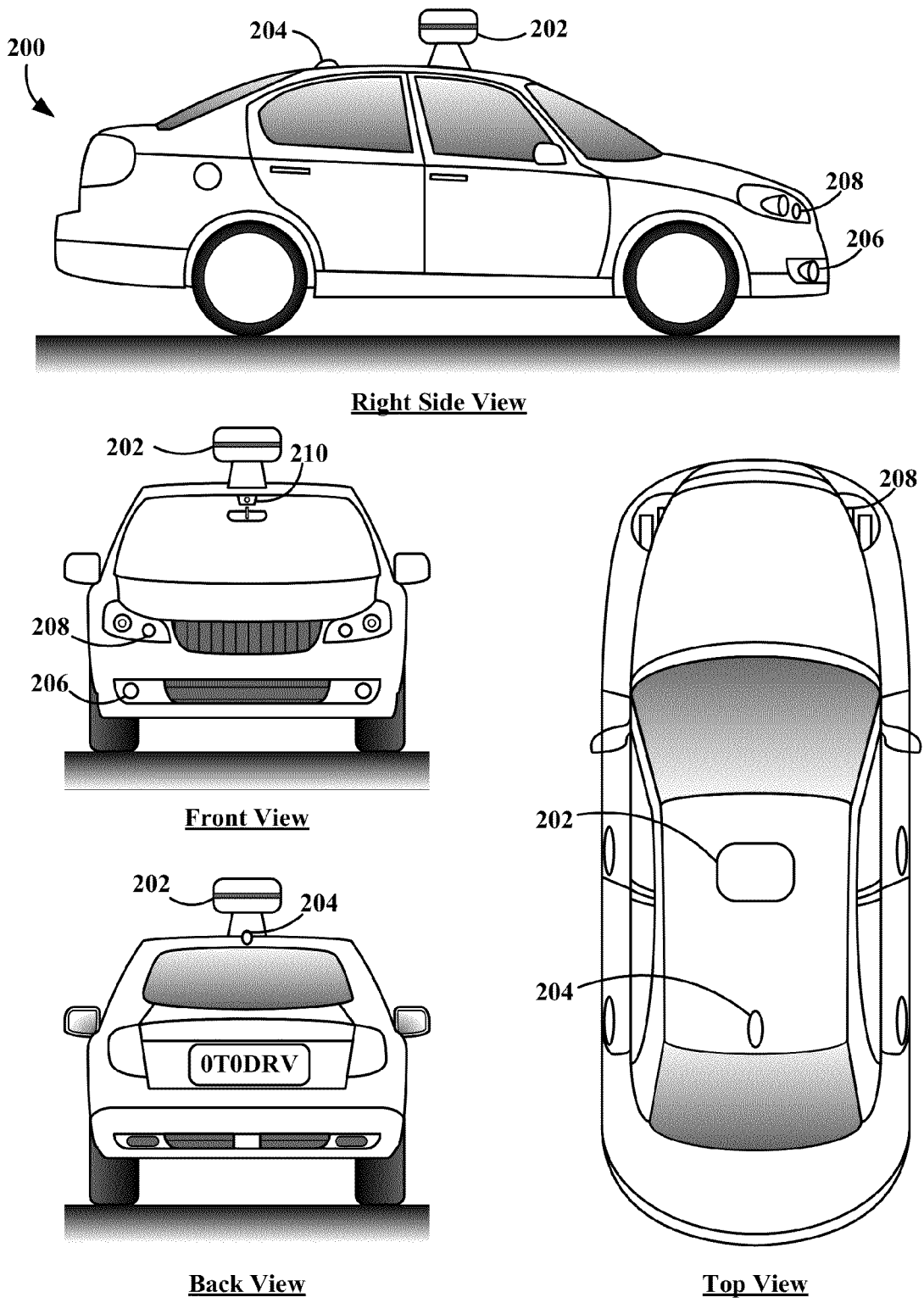
FIG. 2 depicts an example vehicle.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 can include any of the components described in connection with the vehicle 100 of FIG. 1.

The sensor unit 202 is mounted atop example vehicle 200 and includes one or more sensors configured to detect information about an environment surrounding and/or relative to example vehicle 200, and output indications of the information. For example, the sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around example vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of the sensor unit 202 could be distributed in different locations and need not be collocated in a single location. Some possible sensor types and mounting locations include the LIDAR unit 206 and laser rangefinder unit 208. Furthermore, each sensor of the sensor unit 202 could be configured to be moved or scanned independently of other sensors of the sensor unit 202.

The wireless communication system 204 could be located on a roof of example vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to example vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture image data of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 can determine the distance to the points on the object. The predetermined light pattern may comprise infrared light, or radiation at other suitable wavelengths for such measurements.

The camera 210 can be mounted inside a front windshield of example vehicle 200. Specifically, the camera 210 can be situated to capture image data from a forward-looking view with respect to the orientation of example vehicle 200. Other mounting locations and viewing angles of the camera 210 can also be used, either inside or outside example vehicle 200.

The camera 210 can have associated optics operable to provide an adjustable field of view. Further, the camera 210 can be mounted to example vehicle 200 with a movable mount to vary a pointing angle of the camera 210, such as a via a pan/tilt mechanism.

Figure 3:
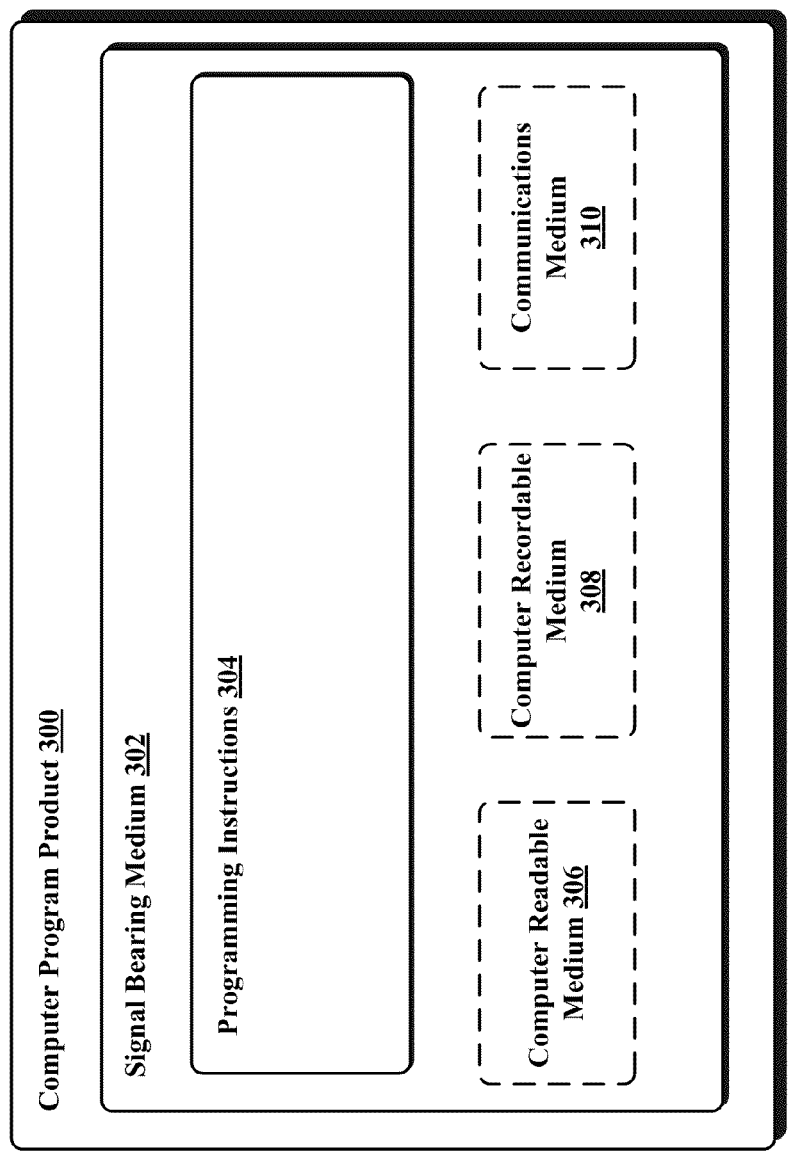
FIG. 3 depicts a computer-readable medium configured according to an example embodiment.

FIG. 3 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described herein.

In some embodiments, the techniques disclosed herein can be implemented by computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 3 is a schematic illustrating a conceptual partial view of an example computer program product 300 that includes a computer program for executing a computer process on a computing device, arranged according to at least some embodiments presented herein.

In one embodiment, the example computer program product 300 is provided using a signal bearing medium 302. The signal bearing medium 302 may include one or more programming instructions 304 that, when executed by one or more processors may provide functionality or portions of the functionality described herein. In some examples, the signal bearing medium 302 can be a non-transitory computer-readable medium 306, such as, but not limited to, a hard disk drive, a Compact Disc (CD), a Digital Video Disk (DVD), a digital tape, memory, etc. In some implementations, the signal bearing medium 302 can be a computer recordable medium 308, such as, but not limited to, memory, read/write (R/W) CDs, R/W DVDs, etc. In some implementations, the signal bearing medium 302 can be a communications medium 310, such as, but not limited to, a digital and/or an analog communication medium (e.g., a fiber optic cable, a waveguide, a wired communications link, a wireless communication link, etc.). Thus, for example, the signal bearing medium 302 can be conveyed by a wireless form of the communications medium 310.

The one or more programming instructions 304 can be, for example, computer executable and/or logic implemented instructions. In some examples, a computing device such as the computer system 112 of FIG. 1 is configured to provide various operations, functions, or actions in response to the programming instructions 304 conveyed to the computer system 112 by one or more of the computer-readable medium 306, the computer-recordable medium 308, and/or the communications medium 310.

The non-transitory computer-readable medium could also be distributed among multiple data storage elements, which could be remotely located from each other. The computing device that executes some or all of the stored instructions could be a vehicle, such as example vehicle 200 illustrated in FIG. 2. Alternatively, the computing device that executes some or all of the stored instructions could be another computing device, such as a server.

Figure 4A:
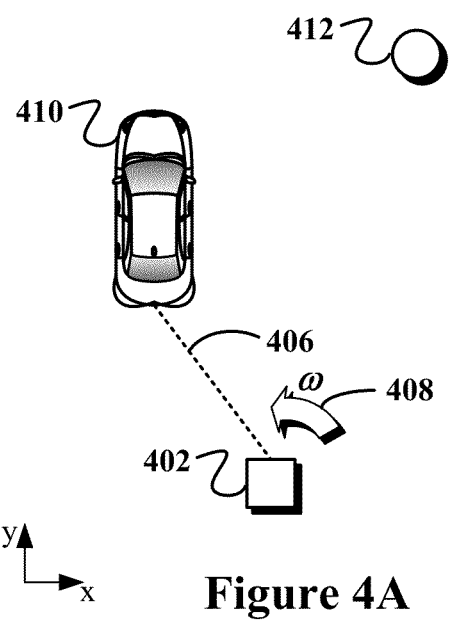
FIG. 4A schematically illustrates an example scenario of a light detection and ranging (LIDAR) device scanning across an obstacle-filled environmental scene.

FIG. 4A schematically illustrates a LIDAR device 402 scanning across an obstacle-filled environmental scene. The example environment depicted in FIG. 4A includes a car 410 and a tree 412. In operation, the LIDAR device 402 rotates according to motion reference arrow 408 with angular velocity w. While rotating, the LIDAR device 402 regularly (e.g., periodically) emits laser beams, such as a laser beam 406. Reflections from the emitted laser beams by objects in the environment, such as the car 410 and the tree 412, are then received by suitable sensors. Precisely time-stamping the receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device 402 for the respective pulse emission allows for determining a position of the reflective feature in three-dimensions.

For illustrative purposes, the environmental scene in FIG. 4A is described in the two-dimensional x-y plane in connection with a single sweep of the LIDAR device 402 that estimates positions to a series of points located in the x-y plane. However, it is noted that a more complete three-dimensional sampling is provided by either adjusting beam steering optics (not shown) of the LIDAR device 402 to direct the laser beam 406 up or down from the x-y plane on its next sweep of the scene or by providing additional lasers and associated beam steering optics dedicated to sampling point locations in planes above and below the x-y plane shown in FIG. 4A, or combinations of these.

In some embodiments, the LIDAR device 402 can be configured to capture one or more laser point clouds of the environmental scene at predetermined time intervals, such as 100 milliseconds (for a refresh rate of 10 frames per second), 33 milliseconds (for a refresh rate of 30 frames per second), 1 millisecond, 1 second, etc.

In some embodiments, a single laser in the LIDAR device 402 can have a scanning range of approximately 150 meters distance, a thirty degree vertical ("altitude") field of view, and approximately a thirty degree horizontal ("azimuth") field of view. Additional lasers included in the LIDAR device 402 can have complementary ranges and fields of view as well so as to provide sufficient coverage of an environmental scene to inform navigational determinations.

Figure 4B:
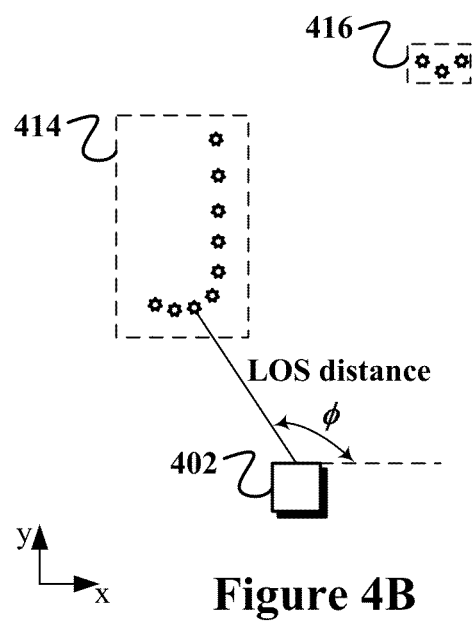
FIG. 4B schematically illustrates an example point cloud corresponding to the obstacle-filled environmental scene of FIG. 4A.

FIG. 4B schematically illustrates an example point cloud corresponding to the obstacle-filled environmental scene of FIG. 4A. Spatial point data (represented by stars) are shown from a ground-plane (or aerial) perspective. Even though the individual points are not equally spatially distributed throughout the sampled environment, adjacent sampled points are roughly equally angularly spaced with respect to the LIDAR device 402. A car spatial data 414 correspond to measured points on the surface of the car 410 with a line of sight to the LIDAR device 402. Similarly, a tree spatial data 416 correspond to measured points on the surface of the tree 412 visible from the LIDAR device 402. The absence of points between the car spatial data 414 and the tree spatial data 416 indicates an absence of reflective features along the sampled line of sight paths in the plane illustrated. In some embodiments, point clouds may have as many as 50,000 laser-indicated points, 80,000 laser-indicated points, 100,000 laser-indicated points, etc.

Each point in the example point cloud illustrated in FIG. 4B can be referenced by an azimuth angle φ (e.g., orientation of the LIDAR device 402 while emitting the pulse corresponding to the point, which is determined by the orientation of a rotating angled mirror (not shown) of the LIDAR device 402 and a line-of-sight (LOS) distance (e.g., the distance indicated by the time delay between pulse emission and reflected light reception). For emitted pulses that do not receive a reflected signal, the LOS distance can optionally be set to the maximum distance sensitivity of the LIDAR device 402. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device 402 and associated optical sensors.

In some embodiments, the sensor fusion algorithm 138, the computer vision system 140, and/or the computer system 112, can interpret the car spatial data 414 alone and/or in combination with additional sensor-indicated information and/or memory-based pattern-matching point clouds and/or baseline maps of the environment to categorize or identify the group of points 414 as corresponding to the car 410. Similarly, the tree spatial data 416 can identified as corresponding to the tree 412 in accordance with a suitable object-detection technique.

In some embodiments, the data storage 114 of the computer system 112 of the vehicle 100 can store object-detector software, code, or other program instructions. Such object-detector software can include, or be part of, one or more of the subsystems of the control system 106 described above, including the sensor fusion algorithm 138, the computer vision system 140, and/or the obstacle avoidance system 144. An object detector may be any configuration of software and/or hardware configured to perceive features in the environmental scene by categorizing and/or identifying objects based on the laser point clouds captured by the laser rangefinder/LIDAR device 128 and/or based on one or more of the sensors in the sensor system 104. As a laser point cloud is captured via the laser rangefinder/LIDAR device 128, data indicative of the captured point cloud is communicated to the object detector, which analyzes the data to determine whether there is an object present in the laser point cloud. Objects indicated by the point cloud may be, for example, a vehicle (e.g., car 410) an obstacle (e.g., tree 412), a pedestrian, a road sign, a traffic light, a traffic cone, etc.

To determine whether an object is present in a laser point cloud image, the object-detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

When the object detector identifies an object in a point cloud, the object detector can define a bounding box encompassing the object that defines predicted outer boundaries of the object. For example, the bounding box can correspond to a predicted exterior surface of the point cloud indicated object. Of course, the bounding "box" can generally take the form of a multi-sided closed shape defining the predicted outer boundaries of the object.

For each captured point cloud, positions of perceived objects and their corresponding boundary definitions are associated with a frame number or frame time. Thus, similarly shaped objects appearing in roughly similar locations in successive scans of the scene can be associated with one another to track objects in time. For perceived objects appearing in multiple point cloud frames (e.g., complete scans of the scanning zone), the object can be associated, for each frame on which the object appears, with a distinct bounding shape defining the dimensional extent of the perceived object.

To assist in providing object recognition, the vehicle 100 can also be in communication with an object-identification server (e.g., via the wireless communication system 146). The object-identification server can verify and/or classify objects detected by the vehicle 100 using the object detector. Moreover, the object-identification server can facilitate optimization of one or more of the parameters used by the object detector to detect objects in the captured laser point cloud based on accumulated data from other similar systems and/or local conditions. In one embodiment, the vehicle 100 can communicate the object boundaries, and their corresponding object parameters, to the object identification server for verification that the perceived objects are correctly identified, such as indicated by an evaluation for statistical likelihood of correct identification.

Further, as noted above, each spatial point can be associated with a respective laser from a set of lasers and a respective timestamp. That is, in an embodiment where the LIDAR device 402 includes multiple lasers, each respective received spatial point can be associated with the particular laser that was detected in accordance with the respective received spatial point. Additionally, each respective spatial point can be associated with a respective timestamp (e.g., a time at which the particular laser was emitted or received). In this way, the received spatial points may be organized, identified, or otherwise ordered on a spatial (laser identification) and/or temporal (timestamp) basis. Such an ordering may assist or improve an analysis of the spatial point data by allowing for organizing the spatial point data into a meaningful order.

Figure 5A:
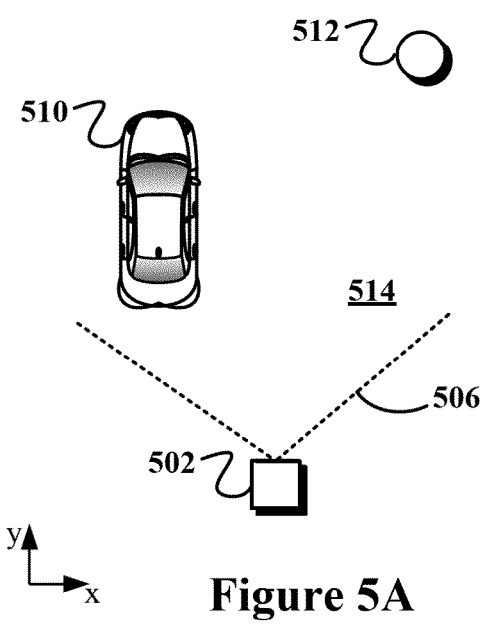
FIG. 5A schematically illustrates an example scenario of a camera capturing image data across an obstacle-filled environmental scene.

FIG. 5A schematically illustrates a camera 502 capturing image data across an obstacle-filled environmental scene. The example environment depicted in FIG. 5A includes a car 510 and a tree 512 located on ground 514. For illustrative purposes, the environmental scene in FIG. 5A is described in the two-dimensional x-y plane in connection with the camera 502 capturing image data comprising a single image based on image capture 506. In some embodiments, the camera 502 can capture image data at predetermined time intervals, such as 100 milliseconds (for a refresh rate of 10 frames per second), 33 milliseconds (for a refresh rate of 30 frames per second), 1 millisecond, 1 second, etc. In some embodiments, the camera 502 can have a range of 150 or 200 meters distance.

Figure 5B:
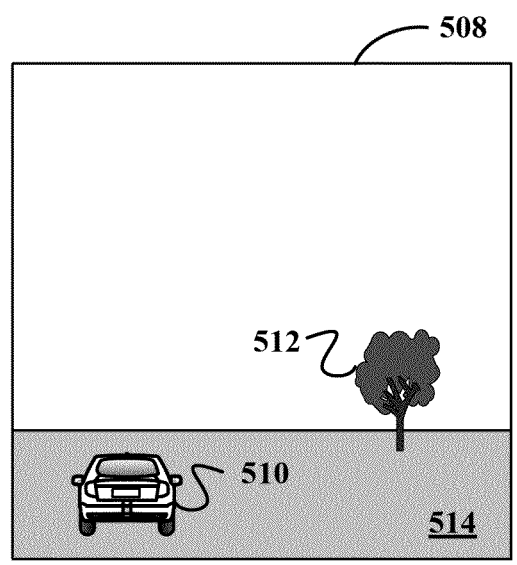
FIG. 5B schematically illustrates an example image corresponding to the obstacle-filled environmental scene of FIG. 5A.

FIG. 5B schematically illustrates an example image 508 corresponding to the obstacle-filled environmental scene of FIG. 5A. As illustrated in FIG. 5B, example image 508 depicts the car 510, the tree 512, and the ground 514. Example image 508 may be formatted in a variety of ways, such as a bitmap comprised of grids of pixels that is stored in accordance with formats that are compressed or uncompressed, lossless (e.g., BMP) or lossy (e.g., JPEG), and bitmap or vector-based (e.g., SVG), as well as computer instructions for drawing graphics.

In some embodiments, the sensor fusion algorithm 138, the computer vision system 140, and/or the computer system 112, can interpret example image 508 alone and/or in combination with additional sensor-indicated information and/or memory based pattern-matching images of the environment to categorize or identify the car 510 and/or the tree 512.

In some embodiments, the data storage 114 of the computer system 112 of the vehicle 100 can store object-detector software, code, or other program instructions. Such object-detector software can include, or be part of, one or more of the subsystems of the control system 106 described above, including the sensor fusion algorithm 138, the computer vision system 140, and/or the obstacle avoidance system 114. An object detector may be any configuration of software and/or hardware configured to perceive features in the environmental scene by categorizing and/or identifying objects based on image data captured by the camera 130 and/or based on one or more of the sensors in the sensor system 104. As an image is captured via the camera 130, data indicative of the captured image is communicated to the object detector, which analyzes the data to determine whether there is an object present in the image data. Objects indicated by the image data may be, for example, a vehicle (e.g., car 510), an obstacle (e.g., 512), a pedestrian, a road sign, a traffic light, a traffic cone, etc.

To determine whether an object is present in image data, the object-detector software and/or module can associate particular image data with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

To assist in providing object recognition, the vehicle 100 can also be in communication with an object-identification server (e.g., via the wireless communication system 146). The object-identification server can verify and/or classify objects detected by the vehicle 100 using the object detector. Moreover, the object-identification server can facilitate optimization of one or more parameters used by the object detector to detect objects in the image data based on accumulated data from other similar systems and/or local conditions. In one embodiment, the vehicle 100 can communicate the object boundaries, and their corresponding object parameters, to the object identification server for verification that the perceived objects are correctly identified, such as indicated by an evaluation for statistical likelihood of correct identification.

Figure 6A:
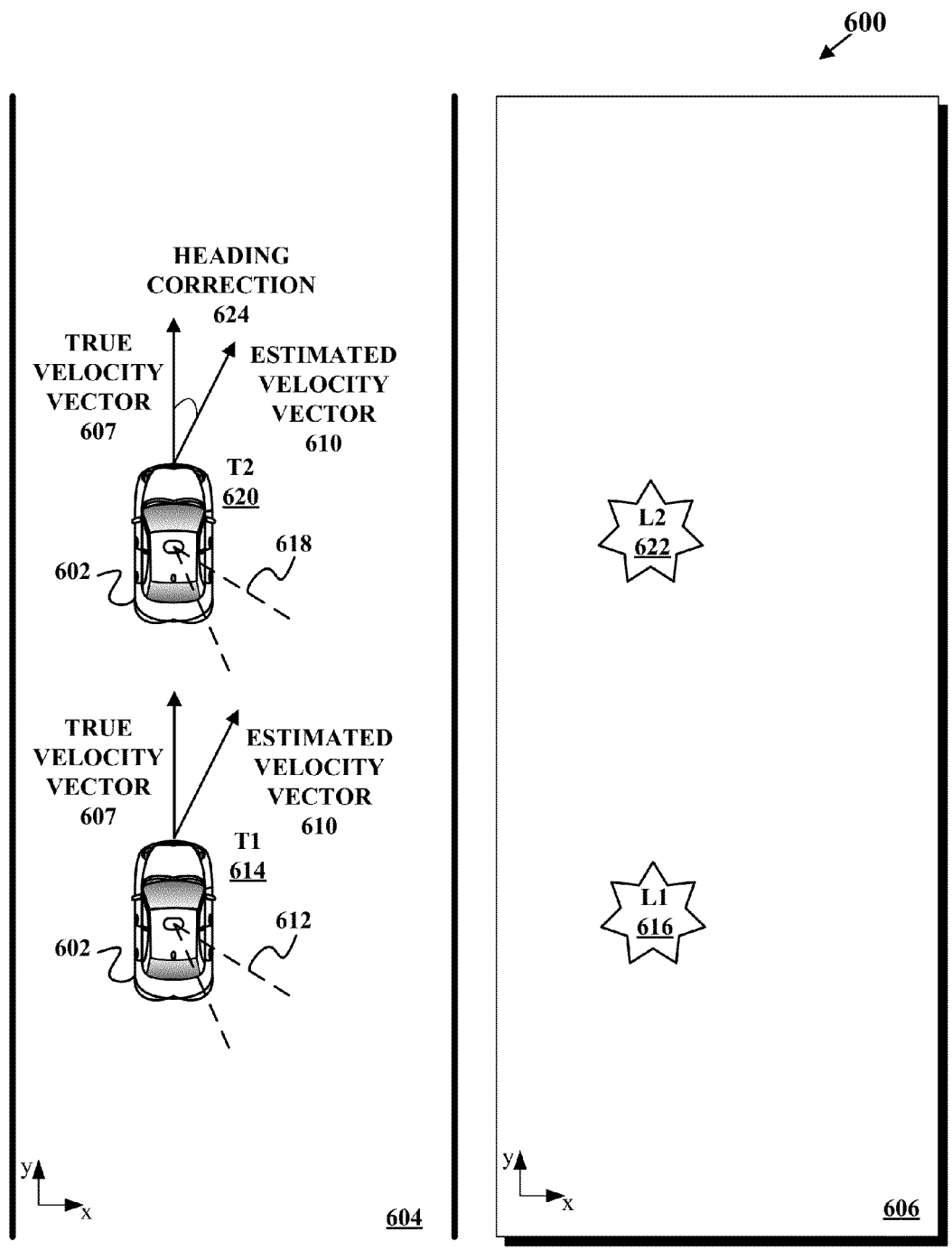
FIG. 6A depicts an example of an autonomous vehicle correcting an estimated heading using a map, according to an example embodiment.

FIG. 6A depicts an example 600 of an autonomous vehicle correcting an estimated heading using a map, according to an example embodiment. In example 600, a vehicle 602 is traveling in an environment 604. The vehicle can be arranged like the vehicle 100 and/or example vehicle 200. The vehicle 602 receives spatial point data that is indicative of a map 606 of the environment 604. For illustrative purposes, the environment 604 and the map 606 is described in the two-dimensional x-y plane.

The spatial point data that is indicative of the map 606 can be arranged in a variety of ways. In some embodiments, the spatial point data can be one or more sets of spatial point data that is indicative of locations of reflective surfaces in the environment 604, such as a database of spatial point data. In some embodiments, the spatial point data can be obtained by one or more LIDAR devices, such as the LIDAR device 402, associated with one or more vehicles, including the vehicle 602. In some embodiments, a particular set of spatial point data among the one or more sets of spatial point data can be obtained after a particular vehicle among the one or more vehicles has traveled a predetermined distance, such as one meter, five meters, ten meters, etc. The particular set of spatial point data among the one or more sets of spatial point data may be tagged with corresponding location information.

In some embodiments, the vehicle 602 can receive data indicative of an approximate location of the vehicle 602 from a GPS associated with the vehicle 602 and receive the spatial point data that is indicative of the map 606 based on the approximate location of the vehicle. With this arrangement, the vehicle 602 might receive the spatial point data before traveling in the environment 604. The vehicle 602 can receive the spatial point data via a wireless communication system associated with the vehicle 602.

Figure 6B:
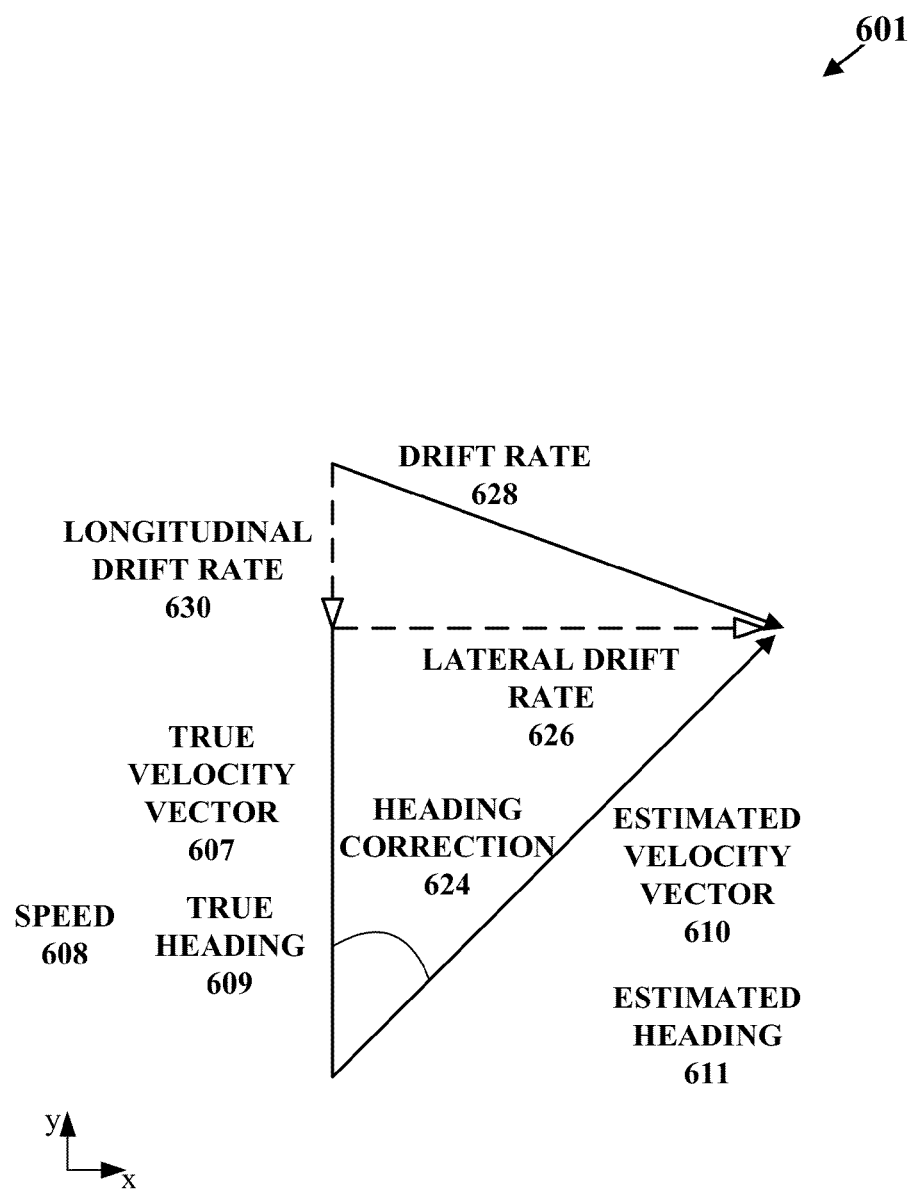
FIG. 6B depicts an example of an autonomous vehicle determining a heading correction, according to an example embodiment.

In example 600, the vehicle 602 is traveling in the environment 604 with a true velocity vector 607 and an estimated velocity vector 610. As illustrated in FIG. 6, the vehicle 602 is traveling forward and the true velocity vector 607 is in one direction. The true velocity vector 607 includes a speed 608 and a true heading 609, and the estimated velocity vector 610 includes an estimated heading 611 (as shown in FIG. 6B). In some embodiments, the vehicle 602 can receive data indicative of the estimated heading 611 from an inertial navigation system associated with the vehicle 602.

In example 600, the environment 604 can be an urban environment, such as a street located among tall buildings (e.g., skyscraper), a bridge, a tunnel, and/or a parking garage. In some situations, data from one or more sensors, such as a GPS associated with a vehicle, might not be suitable for the vehicle to use to navigate through such environments. As one example, data from the GPS might be unreliable or unavailable to correct an estimated heading of the vehicle.

Additionally or alternatively, the environment 604 can be an environment where a vehicle travels in certain traffic patterns, such as a traffic pattern where the vehicle repeatedly starts, stops, and travels at a speed slower than usual (which may commonly be referred to as a traffic jam and/or stop-and-go traffic). In some situations, data from one or more sensors, such as a GPS associated with a vehicle, might not be suitable for the vehicle to use to navigate through such environments. As one example, data from the GPS might be unreliable to correct an estimated heading of the vehicle.

In operation, the vehicle 602 receives a first set of spatial points obtained using a LIDAR device associated with the vehicle 602, such as the LIDAR device 402, based on a first scan 612. The first scan 612 can be one or more sweeps of the LIDAR device. The first set of spatial points is indicative of locations of reflective surfaces in the environment 604 relative to the vehicle 602 at a first time 614. The vehicle 602 determines a first location 616 of the vehicle 602 on the map 606 based on the first set of spatial points. The first location 616 can be an absolute geographical location, such as latitude, longitude, and altitude.

In some embodiments, the vehicle 602 can determine, by a computing device, the first location 616 by comparing and/or matching the first set of spatial point data and the spatial point data that is indicative of the map 606. As one example, the vehicle 602 can determine the first location 616 by comparing and/or matching an azimuth angle of one or more spatial points of the first set of spatial point data and an azimuth angle of one or more spatial points of the spatial point data that is indicative of the map 606.

In operation, the vehicle 602 receives a second set of spatial points obtained using the LIDAR device based on a second scan 618. The second scan 618 can be one or more sweeps of the LIDAR device. The second set of spatial points is indicative of locations of reflective surfaces in the environment 604 relative to the vehicle 602 at a second time 620. The vehicle 602 determines a second location 622 of the vehicle 602 on the map 606 based on the second set of spatial points. The second location 622 can be an absolute geographical location, such as latitude, longitude, and altitude.

In some embodiments, the vehicle 602 can determine, by a computing device, the second location 622 by comparing and/or matching the second set of spatial point data and the spatial point data that is indicative of the map 606. As one example, the vehicle 602 can determine the second location 622 by comparing and/or matching an azimuth angle of one or more spatial points of the second set of spatial point data and an azimuth angle of one or more spatial points of the spatial point data that is indicative of the map 606.

In example 600, the vehicle 602 determines, by a computing device, a heading correction 624 based on the estimated heading 611, the first location 616, the first time 614, the second location 622, the second time 620, and the speed 608 of the vehicle 602. As shown in FIG. 6A, the heading correction 624 is an angle between the true velocity vector 607 and the estimated velocity vector 610.

In example 600, the vehicle 602 uses the estimated heading 611 and the heading correction 624 to navigate through the environment 604. In some embodiments, a control system associated with the vehicle 602 can use the estimated heading 611 and the heading correction 624 to navigate the vehicle 602 through the environment 604.

FIG. 6B depicts an example 601 of an autonomous vehicle determining a heading correction, according to an example embodiment. In example 601, the vehicle 602 determines, by a computing device, the heading correction 624 based on a lateral drift rate 626 divided by the speed 608. The lateral drift rate 626 may represent a rate of change of a lateral error in a position estimate of the vehicle 602. The lateral drift rate 626 may be related to an error in the estimated heading 611.

In example 601, the lateral drift rate 626 is a portion of a drift rate 628 that is substantially perpendicular to the estimated velocity vector 610. As shown in FIG. 6B, a longitudinal drift rate 630 is a portion of the drift rate 628 that is substantially parallel to the estimated velocity vector 610.

In example 601, the vehicle 602 determines the drift rate 628 based on the estimated velocity vector 610, the first location 616, the first time 614, the second location 622, and the second time 620. As one example, the vehicle 602 can determine the drift rate 628 based on an offset divided by a time difference between the first time 614 and the second time 620, wherein the offset is based on the estimated velocity vector 610, the first location 616, and the second location 622. The offset may be a difference between (i) a difference between the second location 622 and an estimated position of the vehicle 602 at the second time 620 based on the estimated velocity vector 610 and (ii) a difference between the first location 616 and an estimated position of the vehicle 602 at the first time 614 based on the estimated velocity vector 610.

Figure 7:
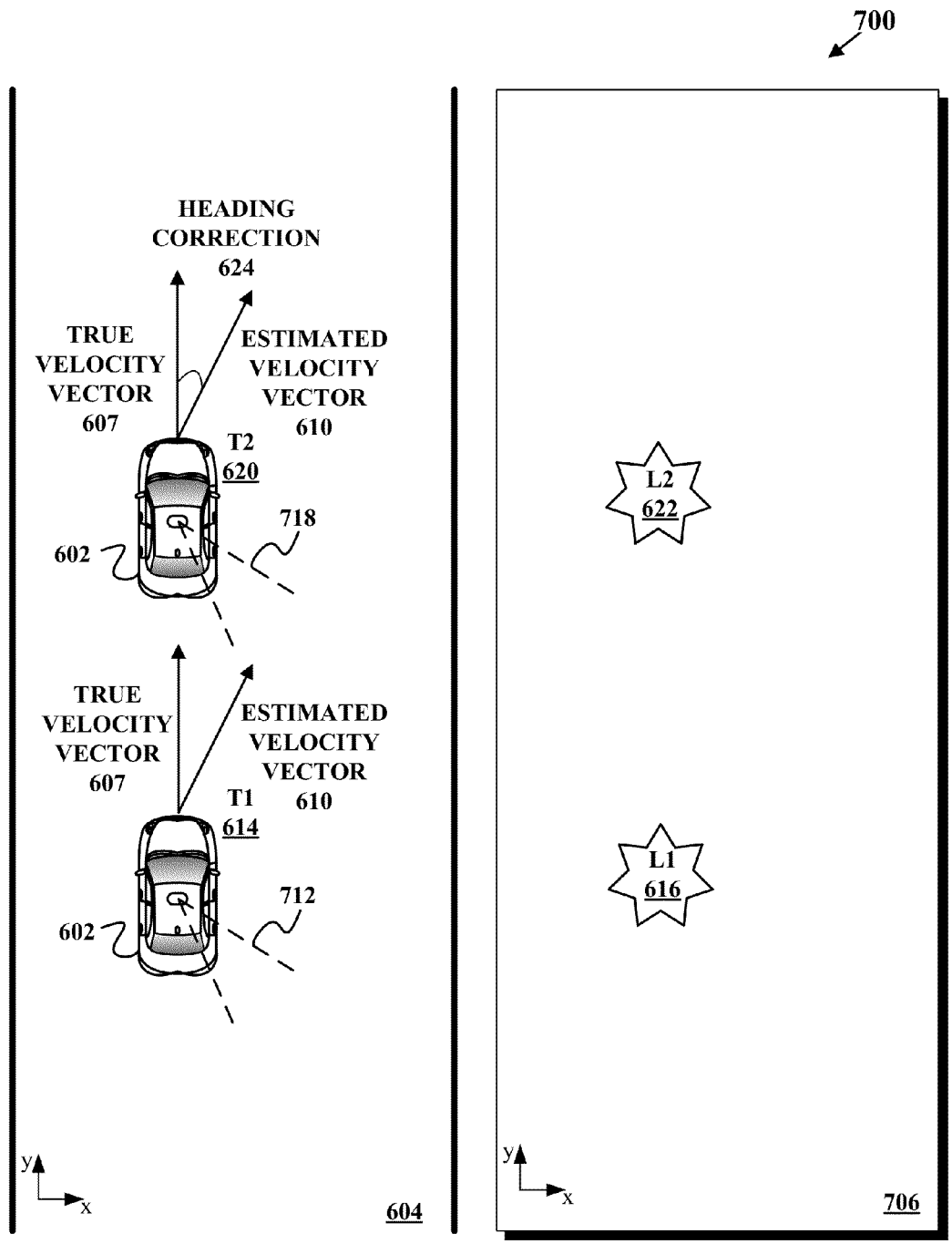
FIG. 7 depicts another example of an autonomous vehicle correcting an estimated heading using a map, according to an example embodiment.

FIG. 7 depicts another example 700 of an autonomous vehicle correcting heading using a map, according to an example embodiment. As illustrated in FIG. 7, the vehicle 602 is traveling in the environment 604 with the true velocity vector 607 and the estimated velocity vector 610. The true velocity vector 607 includes the speed 608 and the true heading 609, and the estimated velocity vector 610 includes the estimated heading 611 (as shown in FIG. 6B). In example 700, the vehicle 602 receives image data that is indicative of a map 706 of the environment. For illustrative purposes, the environment 604 and the map 706 is described in the two-dimensional x-y plane.

The image data that is indicative of the map 706 can be arranged in a variety of ways. In some embodiments, the image data can be one or more images, such as a database of images, that is indicative of objects in the environment 604. In some embodiments, the image data can be obtained by one or more cameras, such as the camera 502, associated with one or more vehicles, including the vehicle 602. In some embodiments, a particular image among the one or more images can be obtained after a particular vehicle among the one or more vehicles has traveled a predetermined distance, such as one meter, five meters, ten meters, etc. The particular image can be tagged with corresponding location information.

In some embodiments, the vehicle 602 can receive data indicative of an approximate location of the vehicle 602 from a GPS associated with the vehicle 602 and receive the image data that is indicative of the map 706 based on the approximate location of the vehicle. With this arrangement, the vehicle 602 might receive the image data before traveling in the environment 604. The vehicle can receive the image data via a wireless communication system associated with the vehicle 602.

In operation, the vehicle 602 receives a first set of image data obtained using a camera associated with the vehicle 602, such as the camera 502, based on a first image capture 712. The first image capture 712 can obtain one or more images. The first set of image data is indicative of locations of objects in the environment 604 relative to the vehicle 602 at the first time 614. The vehicle 602 determines the first location 616 of the vehicle 602 on the map 706 based on the first set of image data.

In some embodiments, the vehicle 602 can determine, by a computing device, the first location 616 by comparing and/or matching the first set of image data and the image data that is indicative of the map 706. As one example, the vehicle 602 can determine, by a computing device, the first location 616 by comparing and/or matching one or more pixels of the first set of image data and the image data that is indicative of the map 706. In some embodiments, the computing device can compare and/or match one or more pixels of the first set of image data and one or more pixels of the image data that is indicative of the map 706 by determining one or more convolution scores for the first set of image data and the image data. The determining one or more convolution scores for the first set of image data and the image data may involve blurring the first set of image data and the image data and converting the first set of image data and the image data into one or more gradient-magnitude images.

In operation, the vehicle 602 receives a second set of image data obtained using the camera based on a second image capture 718. The second image capture 718 can capture one or more images. The second set of image data is indicative of locations of objects in the environment 604 relative to the vehicle 602 at the second time 620. The vehicle 602 determines the second location 622 of the vehicle 602 on the map 706 based on the second set of image data.

In some embodiments, the vehicle 602 can determine, by a computing device, the second location 618 by comparing and/or matching the second set of image data and the image data that is indicative of the map 706. As one example, the vehicle 602 can determine, by the computing device, the second location 618 by comparing and/or matching one or more pixels of the second set of image data and the image data that is indicative of the map 706. In some embodiments, the computing device can compare and/or match one or more pixels of the second set of image data and one or more pixels of the image data that is indicative of the map 706 by determining one or more convolution scores for the second set of image data and the image data. The determining one or more convolution scores for the second set of image data and the image data may involve blurring the second set of image data and the image data and converting the second set of image data and the image data into one or more gradient-magnitude images.

In example 700, the vehicle 602 determines, by a computing device, the heading correction 624 based on the estimated heading 611, the first location 616, the first time 614, the second location 622, the second time 620, and the speed 608 of the vehicle 602. As shown in FIG. 7, the heading correction 624 is the angle between the true velocity vector 607 and the estimated velocity vector 610.

In example 700, the vehicle 602 uses the estimated heading 611 and the heading correction 624 to navigate through the environment 604. The vehicle 602 can use the estimated heading 611 and the heading correction 624 to navigate through the environment 604 in example 700 like the vehicle 602 uses the estimated heading 610 and the heading correction 624 to navigate through the environment 604 in example 600.

In example 700, the vehicle 602 determines the heading correction 624 based on the lateral drift rate 626 divided by the speed 608 like the vehicle 602 determines the heading correction 624 based on the lateral drift rate 626 divided by the speed 608 in example 601.

Figure 8A:
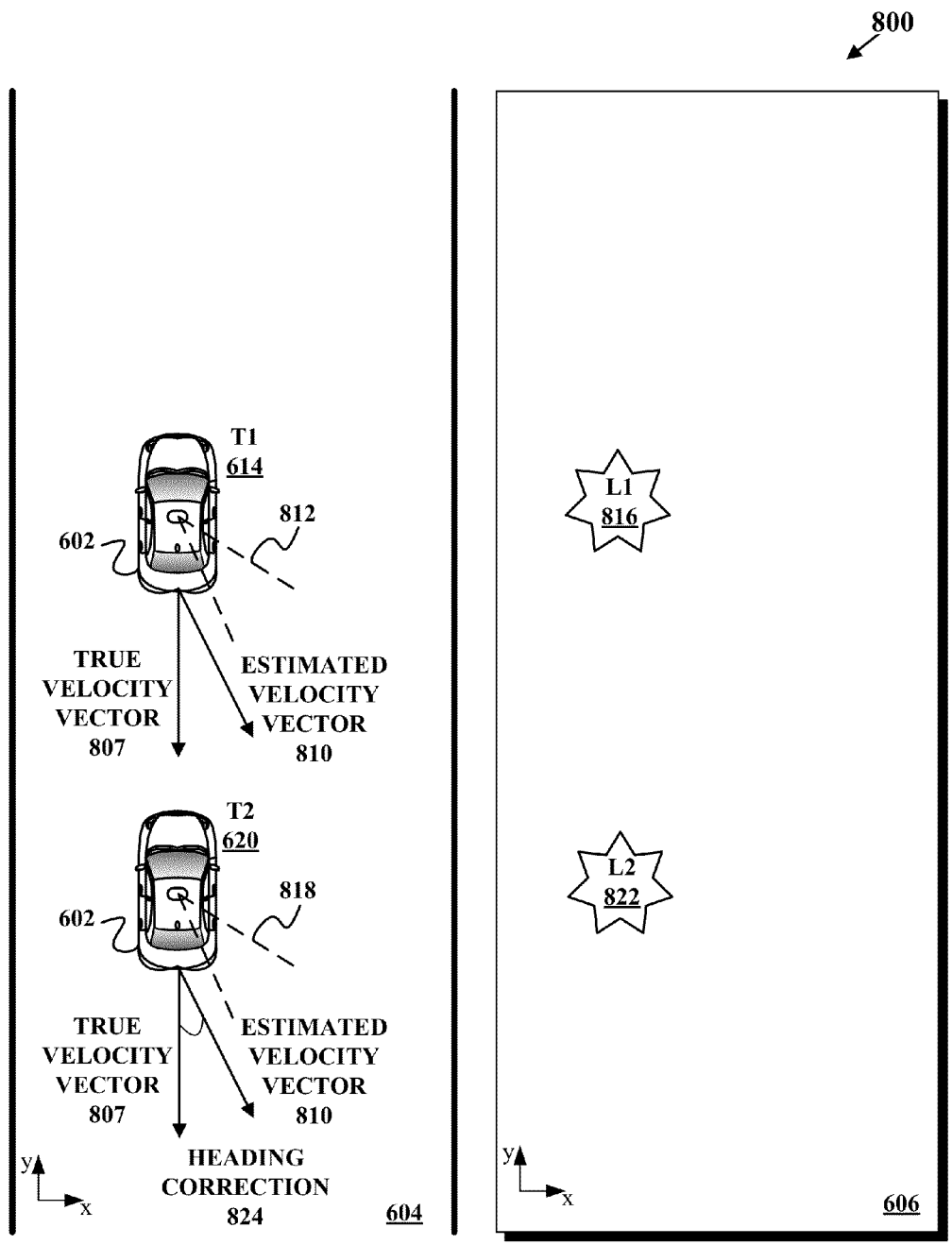
FIG. 8A depicts another example of an autonomous vehicle correcting an estimated heading using a map, according to an example embodiment.
Figure 8B:
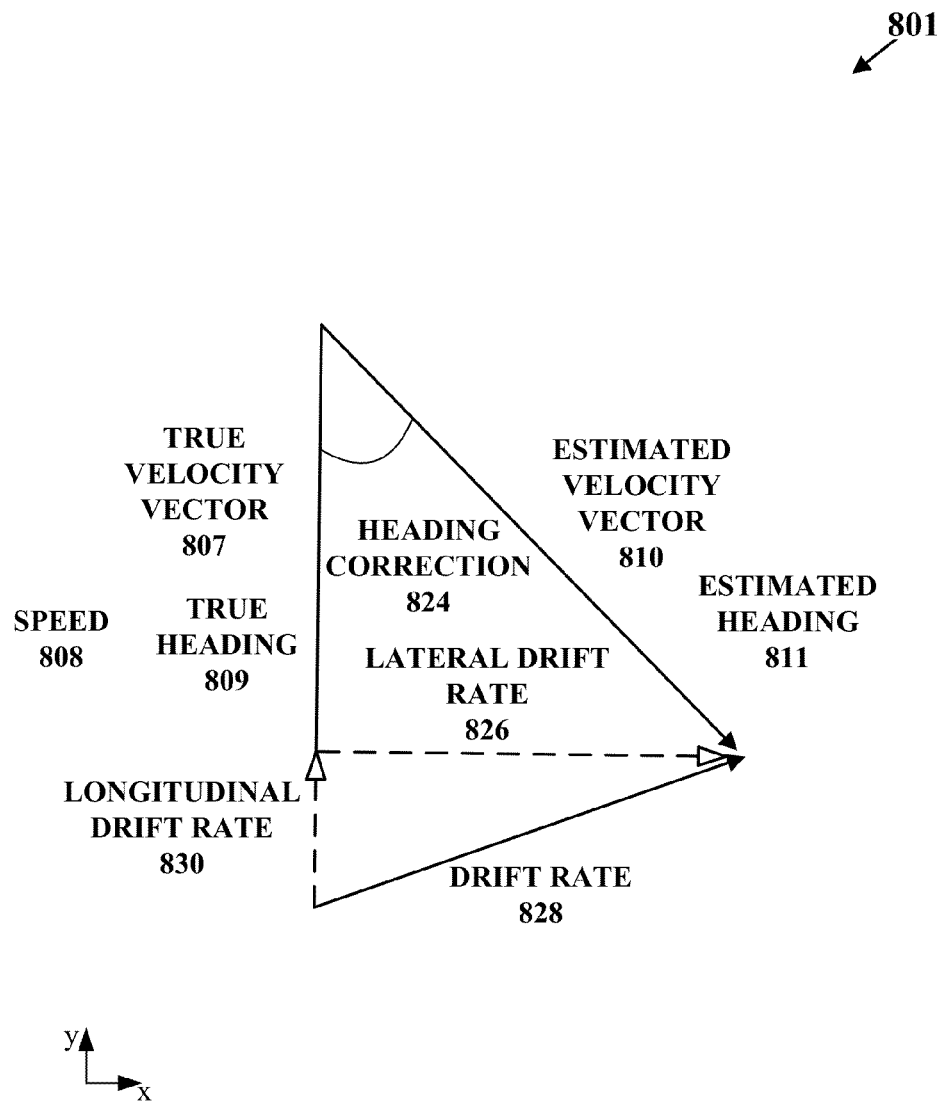
FIG. 8B depicts another example of an autonomous vehicle determining a heading correction, according to an example embodiment.

FIG. 8A depicts another example 800 of an autonomous vehicle correcting heading using a map, according to an example embodiment. In example 800, the vehicle 602 is traveling in the environment 604 with a true velocity vector 807 and an estimated velocity vector 810. The true velocity vector 807 includes a speed 808 and a true heading 809, and the estimated velocity vector 810 includes an estimated heading 811 (as shown in FIG. 8B). As illustrated in FIG. 8A, the vehicle 602 is traveling backward and the true velocity vector 807 is in one direction.

In example 800, the vehicle 602 receives spatial point data that is indicative of the map 606 of the environment 604. The vehicle 602 can receive the spatial point data that is indicative of the map 606 in example 800 like the vehicle 602 receives the spatial point data that is indicative of the map 606 in example 600. For illustrative purposes, the environment 604 and the map 606 is described in the two-dimensional x-y plane.

In operation, the vehicle 602 receives a first set of spatial points obtained using the LIDAR device based on a first scan 812. The first scan 812 can be one or more sweeps of the LIDAR device. The vehicle 602 determines a first location 816 of the vehicle 602 on the map 606 based on the first set of spatial point data. The first location 816 can be an absolute geographical location, such as latitude, longitude, and altitude. The vehicle 602 can determine the first location 816 in example 800 like the vehicle 602 determines the first location 616 in example 600.

In operation, the vehicle 602 receives a second set of spatial points obtained using the LIDAR device based on a second scan 818. The second scan 818 can be one or more sweeps of the LIDAR device. The vehicle 602 determines a second location 822 of the vehicle 602 on the map 606 based on the second set of spatial points. The second location 822 can be an absolute geographical location, such as latitude, longitude, and altitude. The vehicle 602 can determine the second location 822 in example 800 like the vehicle 602 determines the second location 622 in example 600.

In example 800, the vehicle 602 determines, by a computing device, a heading correction 824 based on the estimated heading 811, the first location 816, the first time 614, the second location 822, the second time 620, and the speed 808 of the vehicle 602. As shown in FIG. 8A, the heading correction 824 is an angle between the true velocity vector 807 and the estimated velocity vector 810.

In example 800, the vehicle 602 uses the estimated heading 811 and the heading correction 824 to navigate through the environment 604. In some embodiments, a control system associated with the vehicle 602 can use the estimated heading 811 and the heading correction 824 to navigate through the environment 604.

FIG. 8B depicts an example 801 of an autonomous vehicle determining a heading correction, according to an example embodiment. In example 801, the vehicle 602 determines, by a computing device, the heading correction 824 based on a lateral drift rate 826 divided by the speed 808. The lateral drift rate 826 may represent a rate of change of a lateral error in a position estimate of the vehicle 602. The lateral drift rate 826 may be related to an error in the estimated heading 811.

In example 801, the lateral drift rate 826 is a portion of a drift rate 828 that is substantially perpendicular to the estimated velocity vector 810. As shown in FIG. 6B, a longitudinal drift rate 830 is a portion of the drift rate 828 that is substantially parallel to the estimated velocity vector 810.

In example 801, the vehicle 602 determines the drift rate 828 based on the estimated velocity vector 810, the first location 816, the first time 614, the second location 822, and the second time 620 like the vehicle 602 determines the drift rate 628 based on the estimated velocity vector 610, the first location 616, the first time 614, the second location 622, and the second time 620 in example 601.

Figure 9:
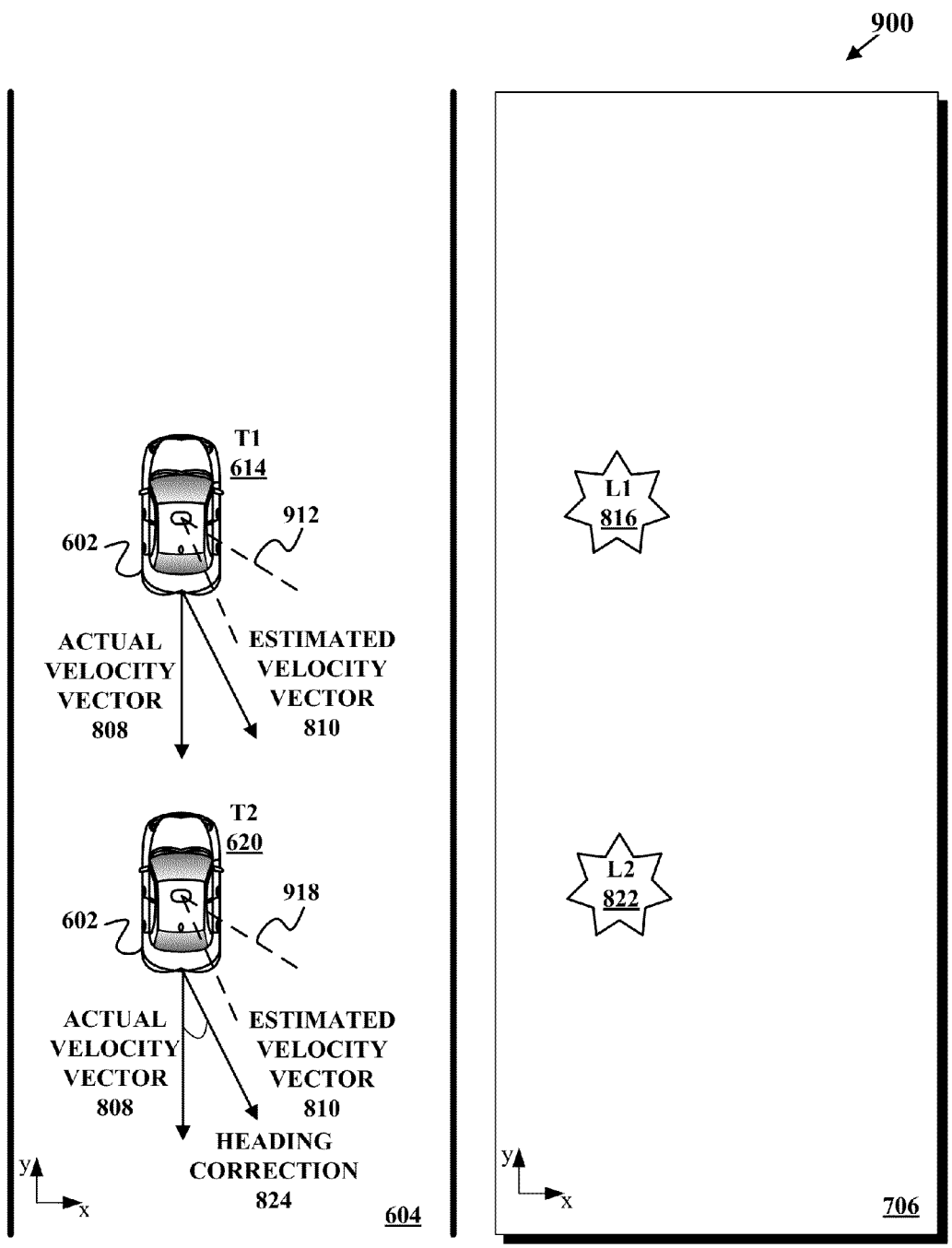
FIG. 9 depicts yet another example of an autonomous vehicle correcting an estimated heading using a map, according to an example embodiment.

FIG. 9 depicts yet another example 900 of an autonomous vehicle correcting heading using a map, according to an example embodiment. As illustrated in FIG. 9, the vehicle 602 is traveling in the environment 604 with the true velocity vector 807 and the estimated velocity vector 810. The true velocity vector 807 includes the speed 808 and the true heading 809, and the estimated velocity vector 810 includes the estimated heading 811 (as shown in FIG. 8B).

In example 900, the vehicle 602 receives image data that is indicative of the map 706 of the environment 604. The vehicle 602 can receive the image data that is indicative of the map 706 in example 700 like the vehicle 602 receives the image data that is indicative of the map 706 in example 700. For illustrative purposes, the environment 604 and the map 706 is described in the two-dimensional x-y plane.

In operation, the vehicle 602 receives a first set of image data obtained using the camera based on a first image capture 912. The first image capture 912 can obtain one or more images. The first set of image data is indicative of locations of objects in the environment 604 relative to the vehicle at the first time 614. The vehicle 602 determines the first location 816 of the vehicle 602 on the map 706 based on the first set of image data. The vehicle 602 can determine the first location 816 in example 900 like the vehicle 602 determines the first location 616 in example 700.

In operation, the vehicle 602 receives a second set of image data obtained using the camera based on a second image capture 918. The second image capture 918 can obtain one or more images. The second set of image data is indicative of locations of objects in the environment 604 relative to the vehicle at the second time 620. The vehicle 602 determines the second location 822 of the vehicle 602 on the map 706 based on the second set of image data. The vehicle 602 can determine the second location 822 in example 900 like the vehicle 602 determines the second location 622 in example 700.

In example 900, the vehicle 602 determines, by a computing device, the heading correction 824 based on the estimated heading 811, the first location 816, the first time 614, the second location 822, the second time 620, and the speed 808 of the vehicle 602. As shown in FIG. 9, the heading correction 824 is the angle between the true velocity vector 807 and the estimated velocity vector 810.

In example 900, the vehicle 602 uses the estimated heading 811 and the heading correction 624 to navigate through the environment 604. The vehicle 602 can use the estimated heading 811 and the heading correction 824 to navigate through the environment 604 in example 900 like the vehicle 602 uses the estimated heading 810 and the heading correction 824 to navigate through the environment 604 in example 800.

In example 900, the vehicle 602 determines the heading correction 824 based on the lateral drift rate 826 divided by the speed 808 like the vehicle 602 determines the heading correction 824 based on the lateral drift rate 826 divided by the speed 808 in example 801.

Figure 10:
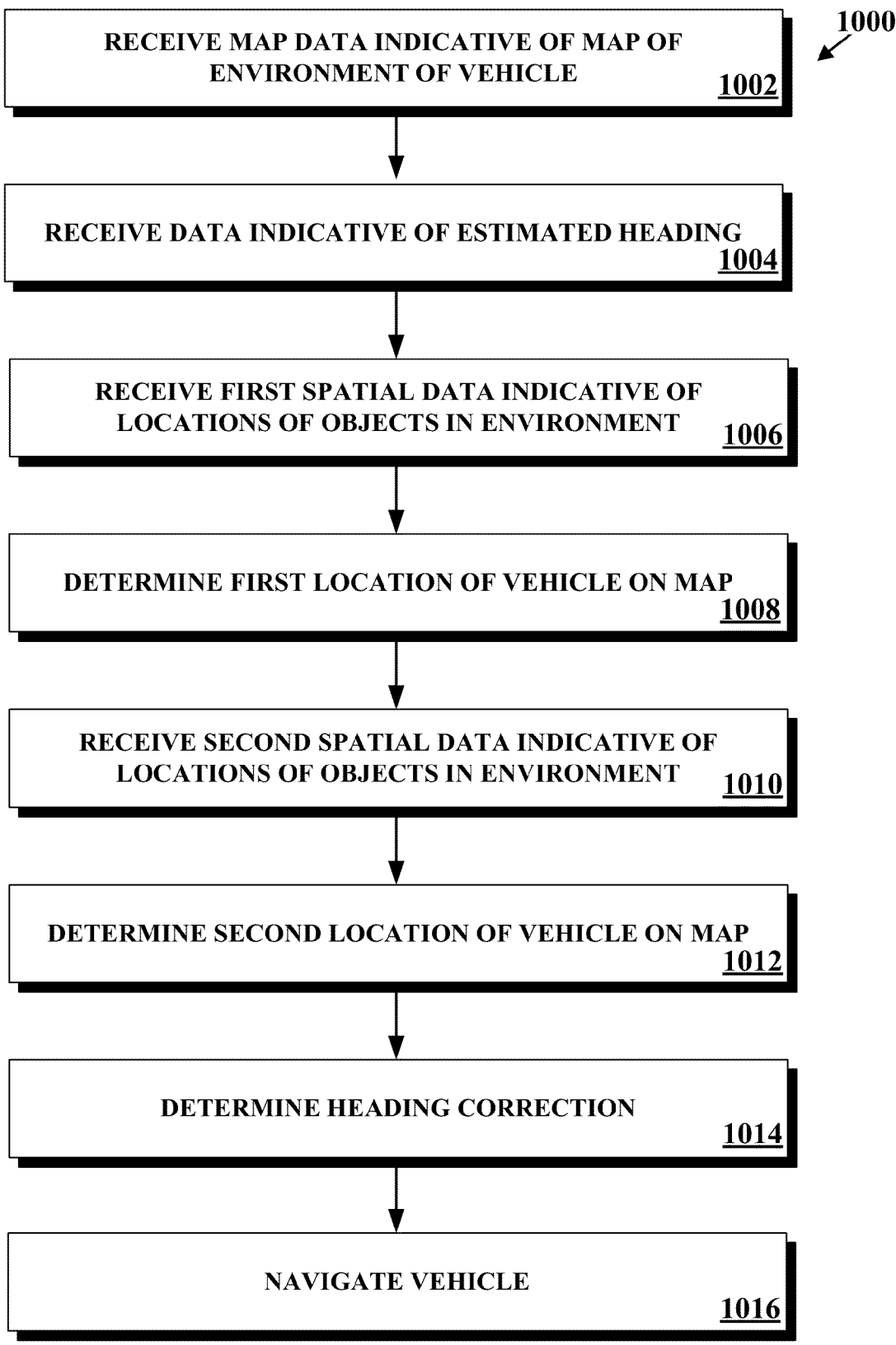
FIG. 10 is a flowchart of a method for correcting an estimated heading using a map, according to an example embodiment.
Figure 11:
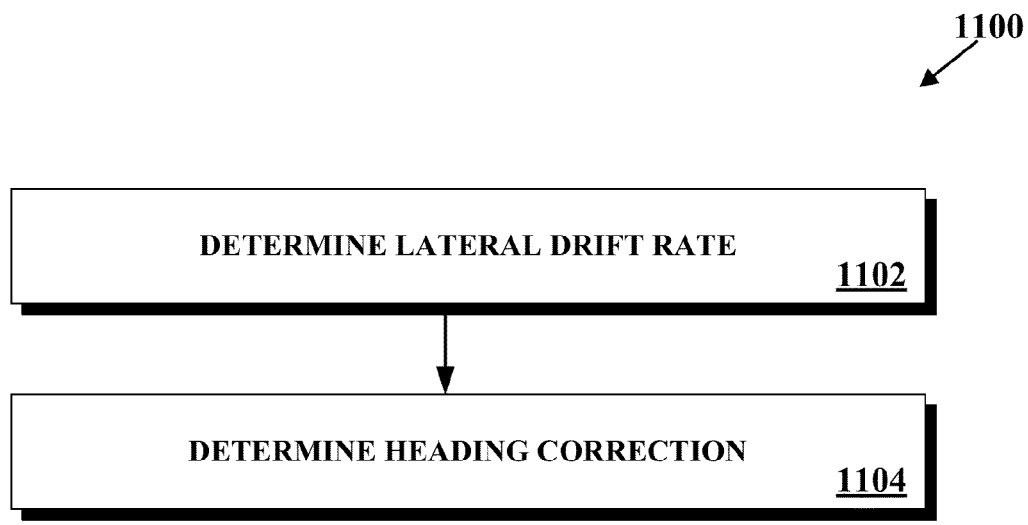
FIG. 11 is a flowchart of a method for determining a heading correction based on a first location, a first time, a second location, a second time, and a speed of a vehicle, according to an example embodiment.
Figure 12:
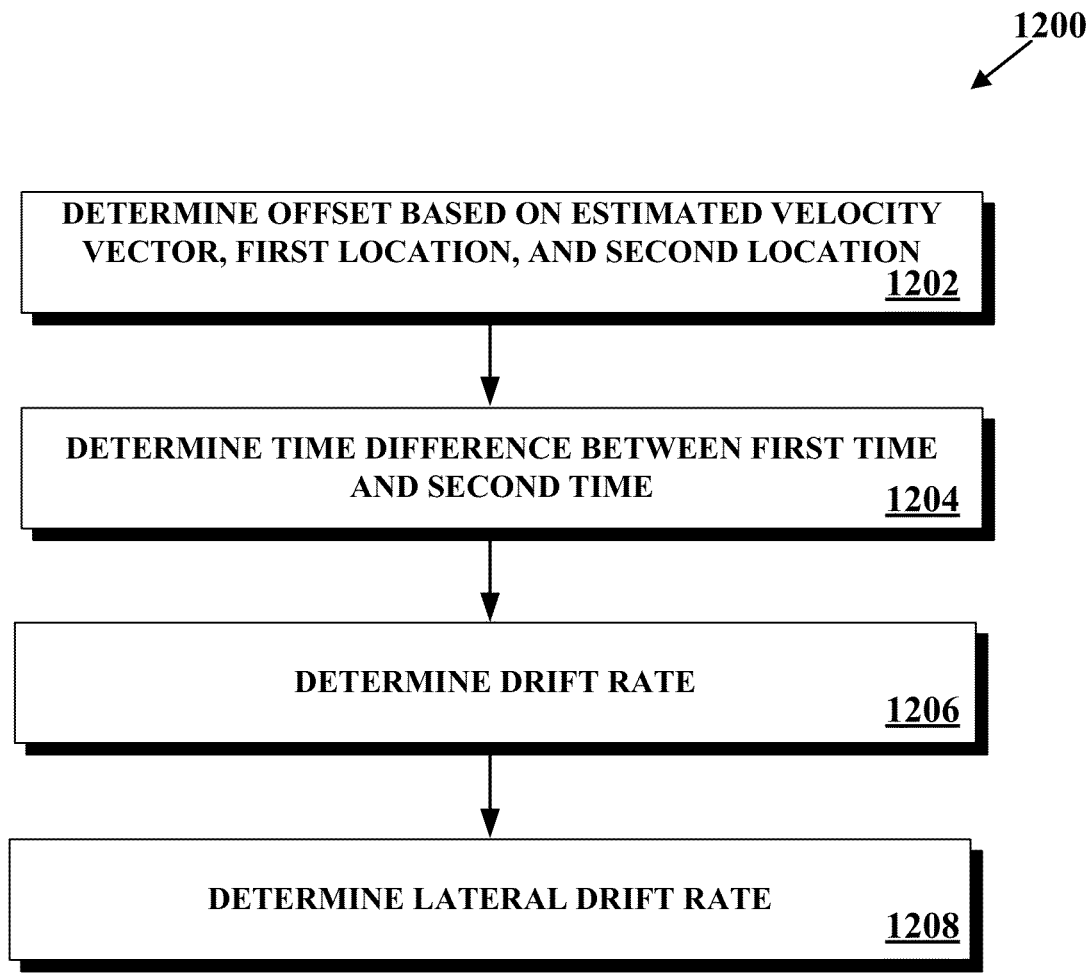
FIG. 12 is a flowchart of an example method for determining a lateral drift rate of the method of FIG. 11.

FIGS. 10-12 each present flowcharts describing processes employed separately or in combination in some embodiments of the present disclosure. The methods described herein are generally described by way of example as being carried out by an autonomous vehicle, such as vehicles 100, 200 described above in connection with FIGS. 1 and 2. For example, the processes described herein can be carried out by the laser rangefinder/LIDAR unit 128 and/or the camera 130 mounted to an autonomous vehicle (e.g., example vehicle 200) in communication with the computer system 112, the sensor fusion algorithm 138, and/or the computer vision system 140. As noted, the methods described herein may also be carried out by a vehicle that may not be autonomous.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 10. Where used, program code can be stored on any type of computer-readable medium (e.g., computer-readable storage medium or non-transitory media, such as the data storage 114 described above with respect to the computer system 112 and/or the computer program product 300), for example, such as a storage device including a disk or hard drive. In addition, each block of the flowchart shown in FIG. 10 can represent circuitry that is wired to perform the specific logical functions in the process. Unless specifically indicated, functions in the flowchart shown in FIG. 10 can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowcharts shown in FIGS. 11 and 12.

FIG. 10 is a flowchart 1000 of a method for correcting an estimated heading using a map, according to an example embodiment. Flowchart 1000 begins with receiving map data that is indicative of a map of an environment of a vehicle (1002). In some embodiments, the environment can be arranged like the environment 604. In some embodiments, the receiving map data that is indicative of a map of an environment of a vehicle comprises receiving map data that is indicative of a map of an environment of a vehicle via a wireless communication system associated with the vehicle, such as the wireless communication system 146.

In some embodiments, the map data comprises spatial point data that is indicative of a map of an environment of the vehicle. In some embodiments, the map data comprises image data that is indicative of a map of an environment of the vehicle.

Flowchart 1000 continues with receiving, from an inertial navigation system associated with the vehicle, data indicative of an estimated heading of the vehicle (1004). In some embodiments, the inertial navigation system can be arranged like the IMU 124. In some embodiments, the estimated heading can be arranged like the estimated heading 611 and/or the estimated heading 811.

Flowchart 1000 continues with receiving first spatial data obtained using a sensor associated with the vehicle, wherein the first spatial data is indicative of locations of objects in the environment relative to the vehicle at a first time (1006). In some embodiments, the first time can be arranged like the first time 614.

In some embodiments, the sensor comprises a LIDAR device. The LIDAR device can be arranged like the laser rangefinder/LIDAR unit 128, the LIDAR unit 206, and/or the LIDAR device 402. In some embodiments, the first spatial data comprises a first set of spatial points indicative of locations of reflective surfaces in the environment relative to the vehicle at a first time. The first set of spatial points can be obtained by the LIDAR device based on a first scan, such as the first scan 612 and/or the first scan 812.

In some embodiments, the sensor comprises a camera. The camera can be arranged like the camera 130, the camera 210, and/or the camera 502. In some embodiments, the first set of spatial data comprises a first set of image data indicative of locations of objects in the environment relative to the vehicle at a first time. The first set of image data can be obtained by the camera based on a first image capture, such as the first image capture 712 and/or the first image capture 912.

Flowchart 1000 continues with determining a first location of the vehicle on the map based on the first spatial data (1008). In some embodiments, the first location can be arranged like the first location 616 and/or the first location 818. In some embodiments, the determining a first location of the vehicle on the map based on the first spatial data comprises comparing and/or matching the first spatial data and the map data, such as in example 600 and/or example 700.

Flowchart 1000 continues with receiving second spatial data obtained using the sensor associated with the vehicle, wherein the second spatial data is indicative of locations of objects in the environment relative to the vehicle at a second time (1010). In some embodiments, the second time can be arranged like the second time 620.

In some embodiments, the second spatial data comprises a second set of spatial points indicative of locations of reflective surfaces in the environment relative to the vehicle at a second time. The second set of spatial points can be obtained by the LIDAR device based on a second scan, such as the second scan 618 and/or the second scan 818.

In some embodiments, the second spatial data comprises a second set of image data indicative of locations of objects in the environment relative to the vehicle at a second time. The second set of image data can be obtained by the camera based on a second image capture, such as the second image capture 718 and/or the second image capture 918.

Flowchart 1000 continues with determining a second location of the vehicle on the map based on the second spatial data (1012). In some embodiments, the second location can be arranged like the second location 622 and/or the second location 822. In some embodiments, the determining a second location of the vehicle on the map based on the second spatial data comprises comparing and/or matching the second spatial data and the map data, such as in example 600 and/or example 700.

Flowchart 1000 continues with determining, by a computing device, a heading correction of the vehicle based on the estimated heading, the first location, the first time, the second location, the second time, and a speed of the vehicle (1014). In some embodiments, the heading correction can be arranged like the heading correction 624 and/or the heading correction 824. In some embodiments, the speed can be arranged like the speed 608 or the speed 808. Alternatively, the speed might not be included in a velocity vector that is in one direction. Instead, the speed could be included in a velocity vector that is primarily in one direction.

Flowchart 1000 continues with navigating the vehicle based on the estimated heading and the heading correction (1016). In some embodiments, a control system associated with the vehicle, such as the control system 106, can use the estimated heading and the heading correction to navigate the vehicle through the environment. As one example, a navigation/pathing system associated with the vehicle, such as the navigation/pathing system 142, and/or an obstacle avoidance system associated with the vehicle, such as the obstacle avoidance system 144, can use the estimated heading and the heading correction to navigate the vehicle through the environment.

Flowchart 1000 may further comprise receiving, from a GPS associated with the vehicle, data indicative of an approximate location of the vehicle; and receiving the map data based on the approximate location of the vehicle. In some embodiments, the GPS associated with the vehicle can be arranged like the GPS 122. In some embodiments, the vehicle can receive the map data before traveling in the environment. Alternatively, in some embodiments, when data from the GPS associated with the vehicle is not unavailable, the vehicle can receive the map data while traveling in the environment.

In another example embodiment, Flowchart 1000 might not begin with receiving map data that is indicative of a map of an environment of a vehicle (1002). Instead, Flowchart 1000 could begin with receiving, from an inertial navigation system associated with the vehicle, data indicative of an estimated heading of the vehicle (1004). Flowchart 1000 could continue with receiving map data that is indicative of a map of an environment of a vehicle (1002).

FIG. 11 is a flowchart 1100 of a method for determining a heading correction based on a first location, a first time, a second location, a second time, and a speed of a vehicle, according to an example embodiment. Flowchart 1100 begins with determining a lateral drift rate of the vehicle based on a drift rate and an estimated velocity vector (1102). In some embodiments, the lateral drift rate can be arranged like the lateral drift rate 626 and/or the lateral drift rate 826.

Flowchart 1100 continues with determining the heading correction based on the lateral drift rate divided by the speed (1104).

FIG. 12 is a flowchart 1200 of an example method for determining a lateral drift rate of the method of FIG. 11. Flowchart 1200 begins with determining an offset based on the estimated velocity vector, the first location, and the second location (1202). In some embodiments, the offset can be a difference between (i) a difference between the second location and an estimated position of the vehicle at the second time based on the estimated velocity vector and (ii) a difference between the first location and an estimated position of the vehicle at the first time based on the estimated velocity vector. In some embodiments, the estimated velocity vector can be arranged like the estimated velocity vector 610 and/or the estimated velocity vector 810.

Flowchart 1200 continues with determining a time difference between the first time and the second time (1204). In some embodiments, the time difference can be an amount of seconds and/or minutes, such as thirty seconds, one minute, two minutes and thirty seconds, five minutes, ten minutes, etc.

Flowchart 1200 continues with determining the drift rate based on the offset divided by the time difference (1206). In some embodiments, the drift rate can be arranged like the drift rate 628 and/or the drift rate 828.

Flowchart 1200 continues with determining the lateral drift rate based on a portion of the drift rate that is substantially perpendicular to the estimated velocity vector (1208).

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method comprising:
receiving, via a processor of a computing device, map data that is indicative of a map of an environment of a vehicle;
receiving, from an inertial navigation system associated with the vehicle, data indicative of an estimated heading of the vehicle;
receiving first spatial data obtained using a sensor associated with the vehicle, wherein the first spatial data is indicative of locations of objects in the environment relative to the vehicle at a first time;
determining a first location of the vehicle on the map based on a comparison of the first spatial data and the map data, wherein the comparison of the first spatial data and the map data comprises determining a gradient-magnitude image based on blurred representations of the first spatial data and the map data;
receiving second spatial data obtained using the sensor associated with the vehicle, wherein the second spatial data is indicative of locations of objects in the environment relative to the vehicle at a second time;
determining a second location of the vehicle on the map based on a comparison of the second spatial data and the map data, wherein the comparison of the second spatial data and the map data comprises determining a gradient-magnitude image based on blurred representations of the second spatial data and the map data;
determining, by the computing device, a heading correction of the vehicle based on the estimated heading, the first location, the first time, the second location, the second time, and a speed of the vehicle; and
navigating the vehicle based on the estimated heading and the heading correction.

2. The method of claim 1, wherein the vehicle is configured to operate in an autonomous mode.

3. The method of claim 1, further comprising:
receiving, from a global positioning system (GPS) associated with the vehicle, data indicative of an approximate location of the vehicle; and
receiving the map data based on the approximate location of the vehicle.

4. The method of claim 1, wherein the determining, by a computing device, a heading correction of the vehicle based on the estimated heading, the first location, the first time, second location, the second time, and a speed of the vehicle comprises:
determining a lateral drift rate of the vehicle based on a drift rate and an estimated velocity vector; and
determining the heading correction based on the lateral drift rate divided by the speed.

5. The method of claim 4, wherein the determining a lateral drift rate of the vehicle based on a drift rate and an estimated velocity vector comprises:
determining an offset based on the estimated velocity vector, the first location, and the second location;
determining a time difference between the first time and the second time;
determining the drift rate based on the offset divided by the time difference; and determining the lateral drift rate based on a portion of the drift rate that is substantially perpendicular to the estimated velocity vector.

6. The method of claim 1, wherein the map data comprises spatial point data that is indicative of a map of an environment of the vehicle.

7. The method of claim 1, wherein the sensor comprises a light detection and ranging (LIDAR) device.

8. The method of claim 7, wherein the first spatial data comprises a first set of spatial points indicative of locations of reflective surfaces in the environment relative to the vehicle at a first time.

9. The method of claim 8, wherein the second spatial data comprises a second set of spatial points indicative of locations of reflective surfaces in the environment relative to the vehicle at a second time.

10. The method of claim 1, wherein the map data comprises image data that is indicative of a map of an environment of the vehicle.

11. The method of claim 1, wherein the sensor comprises a camera.

12. The method of claim 11, wherein the first set of spatial data comprises a first set of image data indicative of locations of objects in the environment relative to the vehicle at a first time.

13. The method of claim 12, wherein the second set of spatial data comprises a second set of image data indicative of locations of objects in the environment relative to the vehicle at a second time.

14. A system comprising:
a sensor associated with a vehicle;
a processing unit;
non-transitory data storage; and
program instructions stored in the non-transitory data storage and executable by the processing unit to carry out functions comprising:
receiving map data that is indicative of a map of an environment of the vehicle; receiving, from an inertial navigation system associated with the vehicle, data indicative of an estimated heading of the vehicle;
receiving first spatial data obtained using the sensor associated with the vehicle, wherein the first spatial data is indicative of locations of objects in the environment relative to the vehicle at a first time;
determining a first location of the vehicle on the map based on a comparison of the first spatial data and the map data, wherein the comparison of the first spatial data and the map data comprises determining a gradient-magnitude image based on blurred representations of the first spatial data and the map data;
receiving second spatial data obtained using the sensor associated with the vehicle, wherein the second spatial data is indicative of locations of objects in the environment relative to the vehicle at a second time;
determining a second location of the vehicle on the map based on a comparison of the second spatial data and the map data, wherein the comparison of the second spatial data and the map data comprises determining a gradient-magnitude image based on blurred representations of the second spatial data and the map data;
determining a heading correction of the vehicle based on the estimated heading, the first location, the first time, the second location, the second time, and a speed of the vehicle; and navigating the vehicle based on the estimated heading and the heading correction.

15. The system of claim 14, wherein the functions further comprise:
receiving, from a global positioning system (GPS) associated with the vehicle, data indicative of an approximate location of the vehicle; and
receiving the map data based on the approximate location of the vehicle.

16. The system of claim 14, wherein the determining a heading correction of the vehicle based on the estimated heading, the first location, the first time, the second location, the second time, and a speed of the vehicle comprises:
determining a lateral drift rate of the vehicle based on a drift rate and an estimated velocity vector; and
determining the heading correction based on the lateral drift rate divided by the speed.

17. The system of claim 14, wherein the determining a lateral drift rate of the vehicle based on a drift rate and an estimated velocity vector comprises:
determining an offset based on the estimated velocity vector, the first location, and the second location;
determining a time difference between the first time and the second time;
determining the drift rate based on the offset divided by the time difference; and
determining the lateral drift rate based on a portion of the drift rate that is substantially perpendicular to the estimated velocity vector.

18. A non-transitory computer-readable medium having program instructions stored therein executable by a computing device to cause the computing device to perform functions comprising:
receiving map data that is indicative of a map of an environment of a vehicle; receiving, from an inertial navigation system associated with the vehicle, data indicative of an estimated heading of the vehicle;
receiving first spatial data obtained using a sensor associated with the vehicle, wherein the first spatial data is indicative of locations of objects in the environment relative to the vehicle at a first time;
determining a first location of the vehicle on the map based on a comparison of the first spatial data and the map data, wherein the comparison of the first spatial data and the map data comprises determining a gradient-magnitude image based on blurred representations of the first spatial data and the map data;
receiving second spatial data obtained using the sensor associated with the vehicle, wherein the second spatial data is indicative of locations of objects in the environment relative to the vehicle at a second time;
determining a second location of the vehicle on the map based on a comparison of the second spatial data and the map data, wherein the comparison of the second spatial data and the map data comprises determining a gradient-magnitude image based on blurred representations of the second spatial data and the map data;
determining a heading correction of the vehicle based on the estimated heading, the first location, the first time, the second location, the second time, and a speed of the vehicle; and
navigating the vehicle based on the estimated heading and the heading correction.

19. The non-transitory computer-readable medium of claim 18, wherein the functions further comprise:
receiving, from a global positioning system (GPS) associated with the vehicle, data indicative of an approximate location of the vehicle; and receiving the map data based on the approximate location of the vehicle.

20. The non-transitory computer-readable medium of claim 18, wherein the determining a heading correction of the vehicle based on the estimated heading, the first location, the first time, the second location, the second time, and a speed of the vehicle comprises:

determining a lateral drift rate of the vehicle based on a drift rate and an estimated velocity vector; and determining the heading correction based on the lateral drift rate divided by the speed.

* * * * *